(12) United States Patent
Swales et al.

(10) Patent No.: US 12,392,316 B1
(45) Date of Patent: Aug. 19, 2025

(54) MARINE CURRENT TURBINE PLATFORM WITH FAIRED SPAR

(71) Applicant: Aquantis, Inc., Santa Barbara, CA (US)

(72) Inventors: Henry Swales, Santa Barbara, CA (US); Peter Stricker, Santa Barbara, CA (US); James George Purnell Dehlsen, Warkworth (NZ)

(73) Assignee: Aquantis, Inc., Santa Barbara, CA (US)

( * ) Notice: Subject to any disclaimer, the term of this patent is extended or adjusted under 35 U.S.C. 154(b) by 0 days.

(21) Appl. No.: 17/751,635

(22) Filed: May 23, 2022

(51) Int. Cl.
| | |
|---|---|
| *F03B 17/06* | (2006.01) |
| *B63B 21/20* | (2006.01) |
| *B63B 35/44* | (2006.01) |
| *F03B 3/14* | (2006.01) |
| *F03B 11/00* | (2006.01) |
| *H02K 7/18* | (2006.01) |

(52) U.S. Cl.
CPC ............ *F03B 17/065* (2013.01); *B63B 21/20* (2013.01); *B63B 35/44* (2013.01); *F03B 3/14* (2013.01); *F03B 11/00* (2013.01); *H02K 7/1823* (2013.01); *B63B 2035/4466* (2013.01); *F05B 2240/93* (2013.01)

(58) Field of Classification Search
CPC ............ B63B 35/44; B63B 2035/4466; H02K 7/1823; F05B 2240/93
USPC ......................................... 290/42, 43, 53, 54
See application file for complete search history.

(56) References Cited

U.S. PATENT DOCUMENTS

| | | | | |
|---|---|---|---|---|
| 7,541,688 | B2 * | 6/2009 | Mackie | F03B 17/061 |
| | | | | 290/54 |
| 8,102,071 | B2 * | 1/2012 | Catlin | F03B 13/264 |
| | | | | 290/43 |
| 8,668,452 | B2 * | 3/2014 | Henriksen | B63B 21/50 |
| | | | | 416/85 |
| 9,041,235 | B1 * | 5/2015 | Hunter | F03B 17/061 |
| | | | | 290/54 |
| 9,334,849 | B2 * | 5/2016 | Dehlsen | F03B 17/061 |
| 9,506,451 | B2 * | 11/2016 | Dehlsen | B63B 77/10 |
| 10,294,917 | B2 * | 5/2019 | Dehlsen | F03B 13/264 |
| 2008/0018115 | A1 * | 1/2008 | Orlov | F03B 17/061 |
| | | | | 290/54 |
| 2009/0015015 | A1 * | 1/2009 | Joutsiniemi | F03D 3/02 |
| | | | | 290/52 |
| 2009/0022597 | A1 * | 1/2009 | Bowie | F03B 17/061 |
| | | | | 416/223 R |
| 2012/0211988 | A1 * | 8/2012 | Harding | F03B 13/183 |
| | | | | 290/54 |

(Continued)

*Primary Examiner* — Charles Reid, Jr.
(74) *Attorney, Agent, or Firm* — Akerman LLP; Trevor Coddington (57) ABSTRACT

The present invention is a marine current turbine featuring a downstream rotor, a faired spar, a deckhouse at the waterline, and a ballasting and mooring arrangement to ensure the center of buoyancy is above the center of gravity to provide a stable platform and ample rotor torque reaction. The faired spar minimizes the wake deficit ingested by the rotor and reduces turbulence and drag on the turbine. The deckhouse provides buoyancy to react to gravitational forces and the downward tension component supplied by the mooring system during maximum platform and rotor drag conditions and reserve buoyancy if a portion of the platform becomes flooded. The mooring arrangement preferably forms a bridle to provide yaw stability.

19 Claims, 12 Drawing Sheets

(56) References Cited

U.S. PATENT DOCUMENTS

| 2013/0140823 | A1* | 6/2013 | Henry | F03D 9/007 |
| | | | | 290/53 |
| 2014/0042749 | A1* | 2/2014 | Siegel | F03B 13/183 |
| | | | | 29/428 |

* cited by examiner

MARINE CURRENT TURBINE PLATFORM WITH FAIRED SPAR

GOVERNMENT LICENSE STATEMENT

This invention was made with government support under the Advanced Research Projects Agency-Energy (ARPA-E) SHARKS program awarded by the United States Department of Energy. The government has certain rights in the invention.

BACKGROUND OF THE INVENTION

1 Field of Invention

This invention relates to platform and mooring configurations and materials for marine current turbines.

2. Description of Related Art

Hydrokinetic energy in tidal and riverine currents is an abundant renewable energy source and highly reliable, forecastable, and typically located near an electrical distribution grid. A marine current turbine, a.k.a., a hydrokinetic turbine (HKT), works much like a submerged windmill, driven by water rather than air. However, water current flows are more predictable than air flows in time and maximum velocity. Underwater rotors capture the dense flowing energy of a current. The tips of the rotor blades are positioned below the surface so they will not danger shipping or be vulnerable to storms.

Significant technical and environmental barriers make current marine current turbine systems prohibitively expensive. An efficient platform supporting the turbine is required to minimize the cost of energy produced by the turbine, which depends on the platform's capital cost, efficiency in electricity production, and the cost to operate and maintain it. The turbine cost of energy is directly impacted by the costs of fabrication, transportation, installation and recovery, and accessibility to perform maintenance.

U.S. Pat. No. 7,541,688 to Mackie discloses a floating, semi-submerged, tethered marine current turbine utilizing surface piercing struts. Because the struts have a small waterplane, most of the turbine's buoyancy is provided by a submerged nacelle. The turbine's draft and trim are altered through solid ballast and filling/emptying ballast tanks using ballast pumps or compressed air.

A marine current turbine attached to a floating platform is preferable and is moored via anchors in powerful tidal streams or river currents. However, conventional floating platforms are ill-equipped to handle wave-induced whole-body motions transmitted to the turbine and generator, reduce the turbine's efficiency, and increase the design loads on the fixed and rotating machinery, particularly the turbine blades. Conventional mooring systems are large and expensive because a floating platform attracts large forces from the waves.

A need, therefore, exists for a floating platform to support a turbine rotor stably at an optimal depth to maximize energy extraction, enable operation in opposite tidal current directions, i.e., an ebb current or a flood current, every six hours, and operate reliably over long periods of unmanned operation. A need exists for a simple, robust, and inexpensive mooring system to restrain the floating platform.

SUMMARY OF THE INVENTION

The present invention overcomes these and other deficiencies of the prior art by providing an accessible, cost-optimized marine current turbine comprising a downstream rotor, a powertrain, a nacelle, a faired spar, a deckhouse at the waterline, and a unique mooring arrangement. Active control surfaces provide stable operation and buoyancy and ballast configuration to ensure the center of buoyancy is above the center of gravity with sufficient separation to provide ample rotor torque reaction. The faired spar minimizes the wake deficit ingested by the rotor and reduces turbulence and drag on the turbine. The deckhouse provides sufficient buoyancy to react to gravitational forces and the downward component of the tension provided by the mooring system during maximum platform and rotor drag conditions. The deckhouse also provides reserve buoyancy if a portion of the platform becomes flooded. The mooring arrangement preferably forms a bridle to provide yaw stability in addition to reacting drag forces.

In an embodiment of the invention, a turbine for converting current flow into electricity comprises: a floating spar platform comprising a nacelle at the bottom end, a faired spar at a midsection, and a deckhouse at the top end; and a rotor disposed at a downstream end of the nacelle. The faired spar comprises a teardrop body and a V-shaped tail. The faired spar may comprise a rotatable fairing. The turbine may further include a spreader disposed on the deckhouse or the nacelle, wherein the spreader comprises two connection points configured to attach to one or more mooring lines. The turbine may comprise a thruster configured to translate and yaw the turbine. The fairing may include a ballast tank. Flooding or evacuating the ballast tank causes the natural frequency of the turbine to vary. The vertical motion of the deckhouse subjected to wave conditions may be modified by flooding or evacuating the ballast tank. The deckhouse may comprise a rudder and an elevator. The deckhouse has a greater waterplane area and buoyancy volume than the faired spar.

In another embodiment of the invention, a turbine for converting current flow into electricity comprises: a floating spar platform comprising a nacelle at the bottom end, a faired spar at a midsection, and a deckhouse at the top end; a nacelle attachment point and a spreader disposed on the floating spar platform, wherein the nacelle attachment point and the spreader comprise outer end connection points for attaching one or more mooring lines; a rotor comprising a plurality of blades operating within a rotor plane; and a thruster configured to drive the rotor in an intended direction between current flow changes. The turbine may further comprise a current flow direction sensor, wherein the current flow direction sensor activates the thruster in response to sensing a change in current flow direction. The rotor is configured to park horizontally to allow maximum bottom clearance during shallow tide or extreme wave conditions. The faired spar may comprise a rotatable fairing. The deckhouse may include a rudder and an elevator.

In yet another embodiment of the invention, a turbine comprises a floating spar platform, a turbine drivetrain attached to the floating spar platform, the turbine drivetrain comprising a main shaft on which a rotor is mounted, a spreader above the turbine drivetrain, and a thruster to drive the floating spar platform in a controlled direction to a downstream operating position. In the operation of the turbine drivetrain, the floating spar platform floats vertically with the turbine's center of gravity located below its center of buoyancy. The rotor may comprise variable pitch blades. The floating spar platform may comprise a deckhouse to access the turbine drivetrain. The floating spar platform comprises a faired spar with a teardrop body and a V-shaped tail.

The present invention achieves stable, safe operation in all sea conditions with unprecedented cost-performance and a high turbine up-time. Renewable energy can be delivered to remote and local electrical grids. The invention operates autonomously, with remote supervisory control and a data acquisition computer providing data analysis and operator input to the onboard controller. The control system can prioritize maintaining the lowest energy cost, increasing component life, and maximum available energy.

The foregoing and other features and advantages of the invention will be apparent from the following, a more detailed description of the invention's preferred embodiments, as shown in the accompanying drawings and the claims.

BRIEF DESCRIPTION OF THE DRAWINGS

For a complete understanding of the present invention and its advantages, reference is now made to the ensuing descriptions taken in connection with the accompanying drawings briefly described as follows.

DETAILED DESCRIPTION OF PREFERRED EMBODIMENTS

Preferred embodiments of the present invention and their advantages may be understood by referring to FIGS. 1-4D, wherein like reference numerals refer to like elements. Although the present invention is described in the context of a marine environment, i.e., a marine turbine, the present invention may be deployed in any water environment with a flowing current, such as a freshwater river or lake.

The invention advances floating platforms and mooring systems for a marine current turbine by reducing structural mass in favor of active controls to maintain the stable operation of a highly unconstrained, energy-generating tidal turbine. The invention utilizes a minimum mass/volume surface-following deckhouse to support an optimized sub-structure carrying a rotor and powertrain to generate electricity. A faired structural spar provides personnel access to a nacelle for servicing the powertrain components and minimizes wake effects on the rotor while providing an active control surface for operational stability and ballast tanks within the faired profile. A two-bladed, independent pitch rotor is designed to be parked horizontally to enable a minimal parking depth and the ability to utilize the blades for controlling the direction of yaw during tidal changes.

Figure 1A:
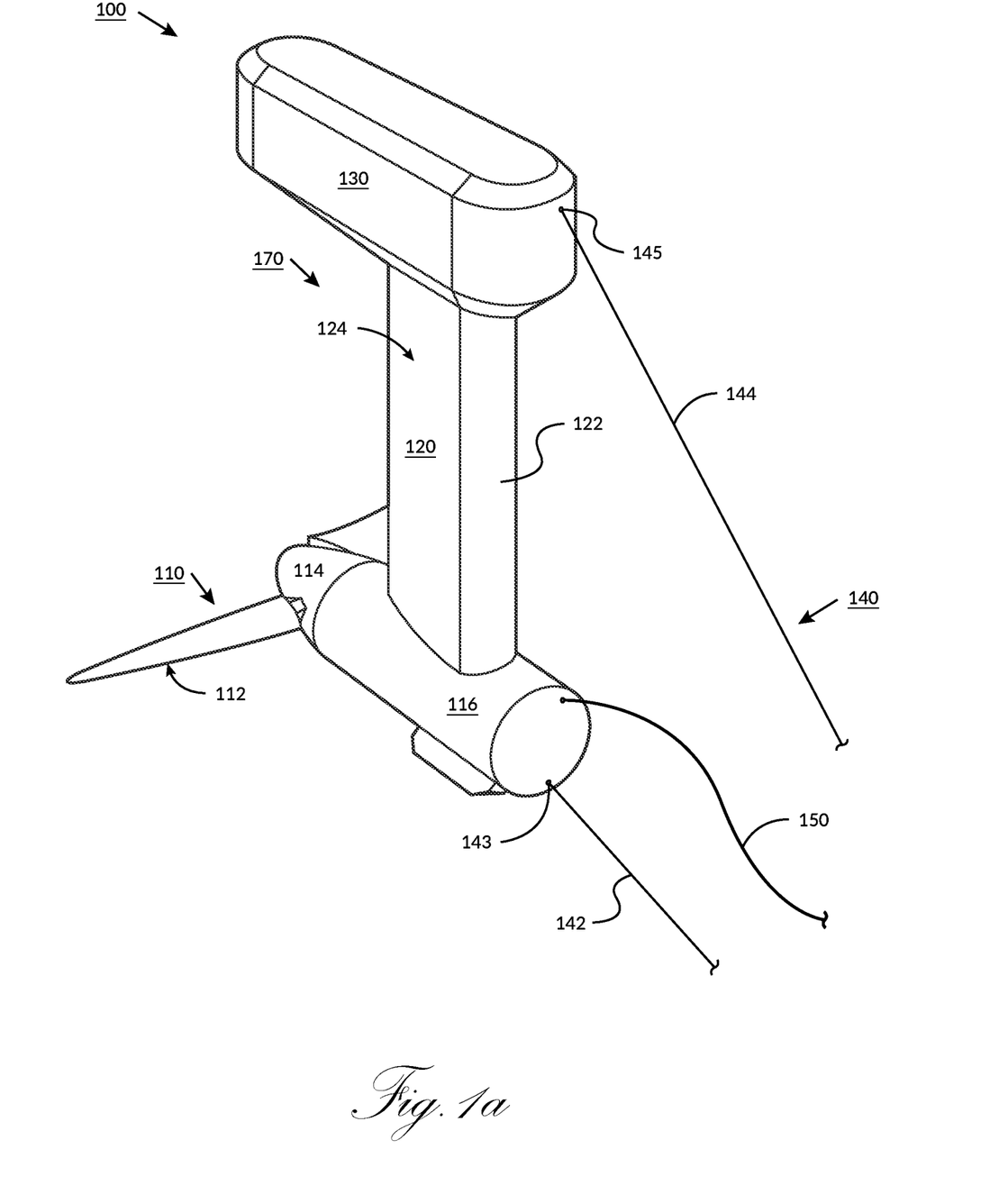
FIG. 1A illustrates a marine current turbine system according to an embodiment of the invention.
Figure 1B:
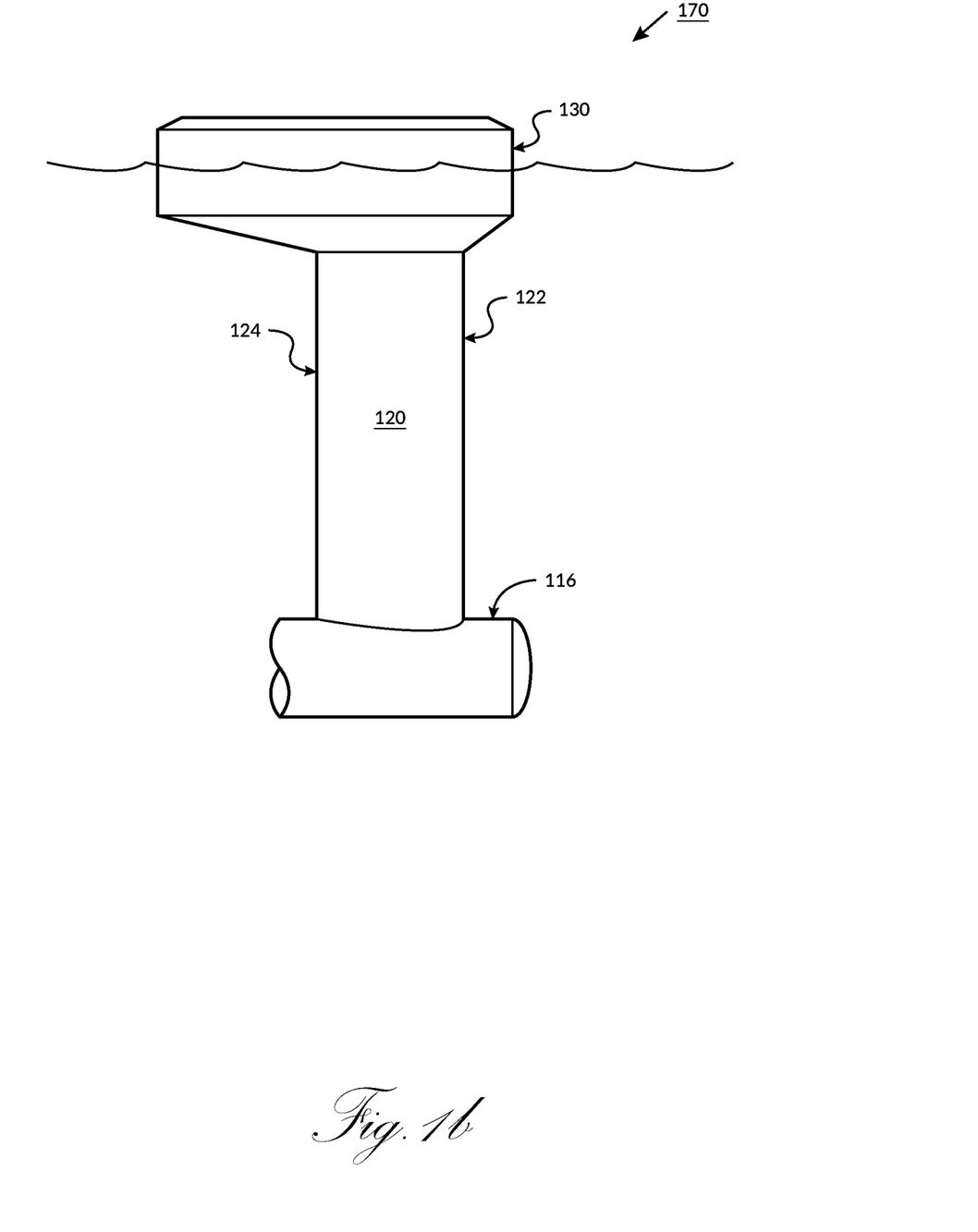
FIG. 1B illustrates a floating spar platform of the marine current turbine system of FIG. 1A.
Figure 1C:
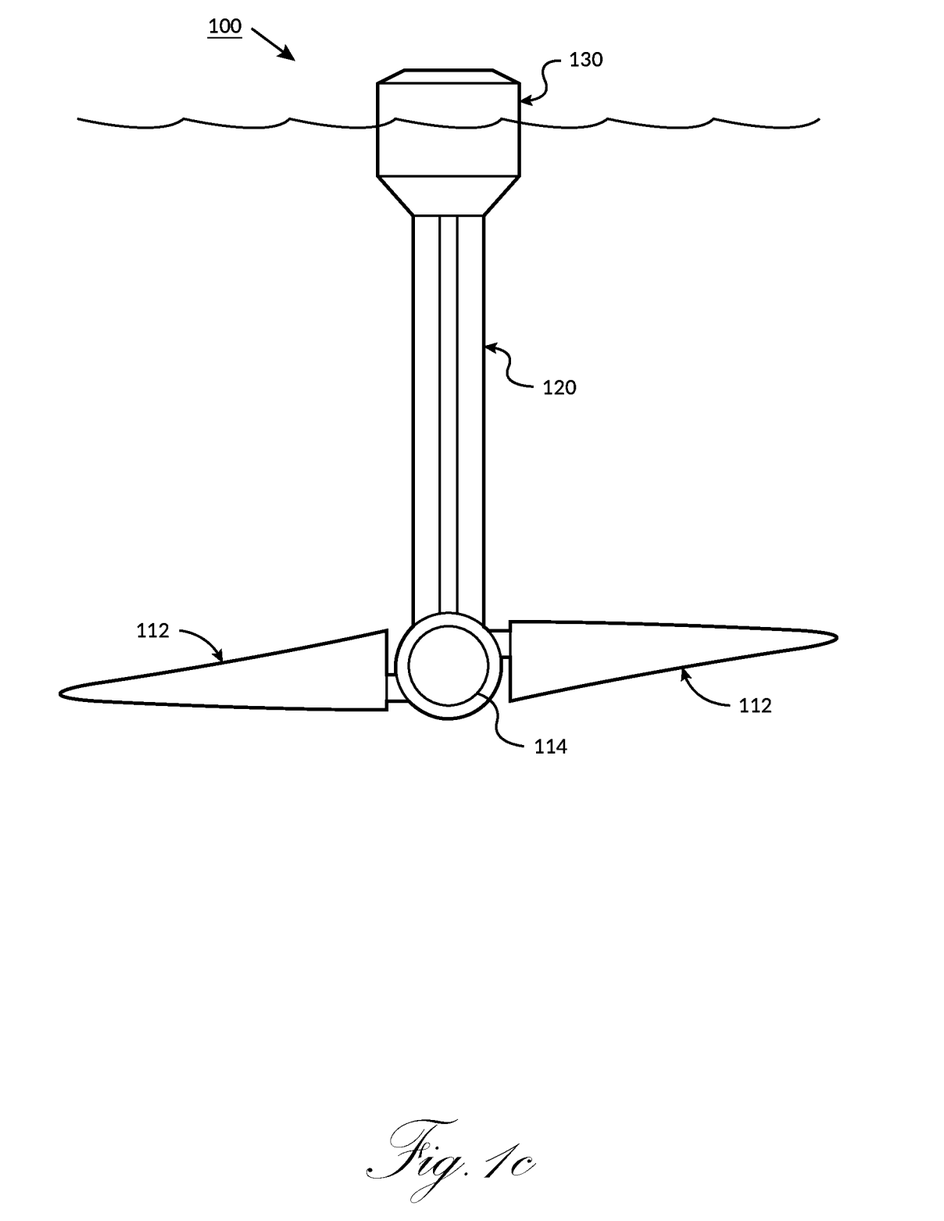
FIG. 1C illustrates a rear (upstream) view of the marine current turbine of FIG. 1A.

FIGS. 1A-C illustrate a marine current turbine system 100 according to an embodiment of the invention. FIG. 1A shows a perspective view of the marine current turbine 100. The marine current turbine 100 comprises a downstream two-bladed rotor 110, a hub 114, a nacelle 116, a faired spar 120, a deckhouse 130, and a mooring system 140. The nacelle 116, the faired spar 120, and the deckhouse 130 collectively form a floating spar platform 170. FIG. 1B shows a side view of the floating spar platform as it would float in a marine environment. FIG. 1C shows a rear view of the marine current turbine 100 in the marine environment.

By placing the rotor 110 downstream, a direct load path is established from the rotor 110 to the anchor via a lower mooring line 142. This puts the primary load-bearing structure, the nacelle 116, in a pure tensile function, reducing the faired spar 120 structural member thickness and cost. The two-bladed rotor 110 serves several vital functions. Primarily, it enables a novel operating mode wherein rotor blades 112 can be parked horizontally, thereby significantly reducing the overall draft of the turbine. This is essential for deploying the largest rotor plane possible at a site with significant depth fluctuations during large slack tidal and wave events. The two-bladed rotor 110 also enables a large pitch bearing spread in a compact hub 114 as disclosed in commonly-owned U.S. patent application Ser. No. 17/688,772, entitled "Fixed and Pitching Blades, Spar Shaft, Bearings and Materials for Marine Current Turbine," filed Mar. 7, 2022, the entire disclosure of which is incorporated by reference herein. Independent blade pitch control is also made possible via actuators within the nacelle 116 utilizing concentric mechanical linkages within the main shaft. In an alternative embodiment of the invention, the rotor 110 may use one or three or more blades 112.

The faired spar 120 connects the nacelle 116 to the deckhouse 130, where a large portion of the platform's 170 buoyancy resides. This arrangement ensures the center of buoyancy is above the center of gravity to provide a stable platform and ample rotor torque reaction. This arrangement also ensures that a portion of platform 170 is always at the sea surface for access. The faired spar 120 also provides access to the rotor's 110 drivetrain in the nacelle 116 from the deckhouse 130 for maintenance activities. Faired spar 120 width is kept to a minimum and embodies a streamlined profile, whereby the fairing shape surrounds a tubular spar at its leading edge, and its thickness distribution along the chord line becomes narrower as it approaches the tail to minimize the wake deficit ingested by the rotor 110 and reduce turbulence and drag on the turbine 100 by the current flow. In an embodiment of the invention, the faired spar 120 comprises a teardrop fairing body 122 characterized by sides that converge into a V-shaped tail 124. An optional longitudinal flange may be included downstream from the V-shaped tail 124 to form a Y-shaped tail. In other embodiments, the faired spar 120 may be foil-shaped (as in airfoil or hydrofoil) with a low-drag profile. Its trailing edge may be sharp or blunt. Blunt trailing edges may be rounded or flat. More complex trailing edges may be applied to reduce noise, hydro-elastic singing, or shed vorticity. These complex shapes include serrations, flat-plate extension, asymmetric (rounded on one side, sharp corner on the other), and may be formed of a stiff or compliant material. The thickness to chord ratio can be 1:2 to 1:8. Preferably, the height of the spar 120 holds the rotor 110 at a depth that the blades 112 remain at least one meter below the sea surface.

The deckhouse 130 provides ample buoyancy to react to gravitational forces and the downward force component of the tension provided by the mooring system 140 during maximum platform and rotor drag conditions and reserve buoyancy in the event a portion of the platform 100 becomes flooded. The deckhouse 130 has a large waterplane area and buoyancy volume relative to the faired spar 120 to minimize platform height above water and variation in the draft induced by changing drag forces on the mooring system 140. The deckhouse 130 also provides an access hatch and houses equipment that may require regular servicing or replacement, such as power electronics, electrical transformers, and controllers. The deckhouse 130 ensures that platform 170 follows the variations in water surface profile, including changes in sea state and tidal elevations, enabling the rotor's 110 submersion depth to be maintained relative to the surface. This surface-following capability allows the turbine 100 to operate in the highest current velocities near the surface due to the shear effects of the moving fluid. Consistent rotor 110 submersion depth reduces the potential for cavitation damage of the blade tips 112 as they traverse near the surface and reduces the impact of wave orbitals on the rotor 110. The deckhouse 130 is surface-following because it has a greater waterplane area and buoyancy volume relative to the faired spar 120.

In another embodiment of the invention, the traditional use of steel to form marine structures is substituted for cementitious materials such as ordinary Portland cement (OPC), ultra-high performance concrete (UHPC), or geopolymer concrete (GPC) combined with reinforcing materials such as steel, carbon fiber, basalt fiber, glass fiber, and other suitable materials, the identification of which is apparent to one of ordinary skill in the art, in the form of woven mat, mini-rods, mini-bars, rebars, and dispersed fibers for fabrication of the floating spar platform 170. The application of cementitious materials provides certain benefits such as reduced material cost relative to steel, reduced fabrication costs, and enhanced corrosion resistance in a marine environment.

The mooring system 140 comprises two attachment points on the turbine 100: one generally inline between the rotor center of effort 143 on the nacelle 116, reacting primarily with the drag imposed by the rotor 110 and nacelle 116, and an upstream anchor 210 (shown in FIG. 2A), and another attachment point 145 higher on the platform 170 than the first to react to the drag of the spar 120 and the deckhouse 130. The upper mooring attachment point 145 may be above or below the waterline. Mooring lines 142 and 144 attach to these two points, 143 and 145, respectively. Either upper or lower mooring lines 142 and 144 may be split and bridled laterally to provide additional yaw stability. In one embodiment, the bridal lines 142 and 144 are attached via a movable attachment point, windlass, winch, or similar system, the identification and implementation of which is apparent to one of ordinary skill in the art.

In another embodiment of the invention, an electrical power and data umbilical 150 exits the turbine 100 from any location, preferably from the front of the nacelle 116 or deckhouse 130, depending on if the transmission is to equipment located on the sea surface or seabed. If the transmission is to the seabed and a single anchor is utilized, the umbilical 150 should land close to the anchor 210. Cable management hardware, floats, weights, or bend restrictors may be implemented on the umbilical 150 or mooring lines 142 and 144 to regulate their interaction.

Figure 2A:
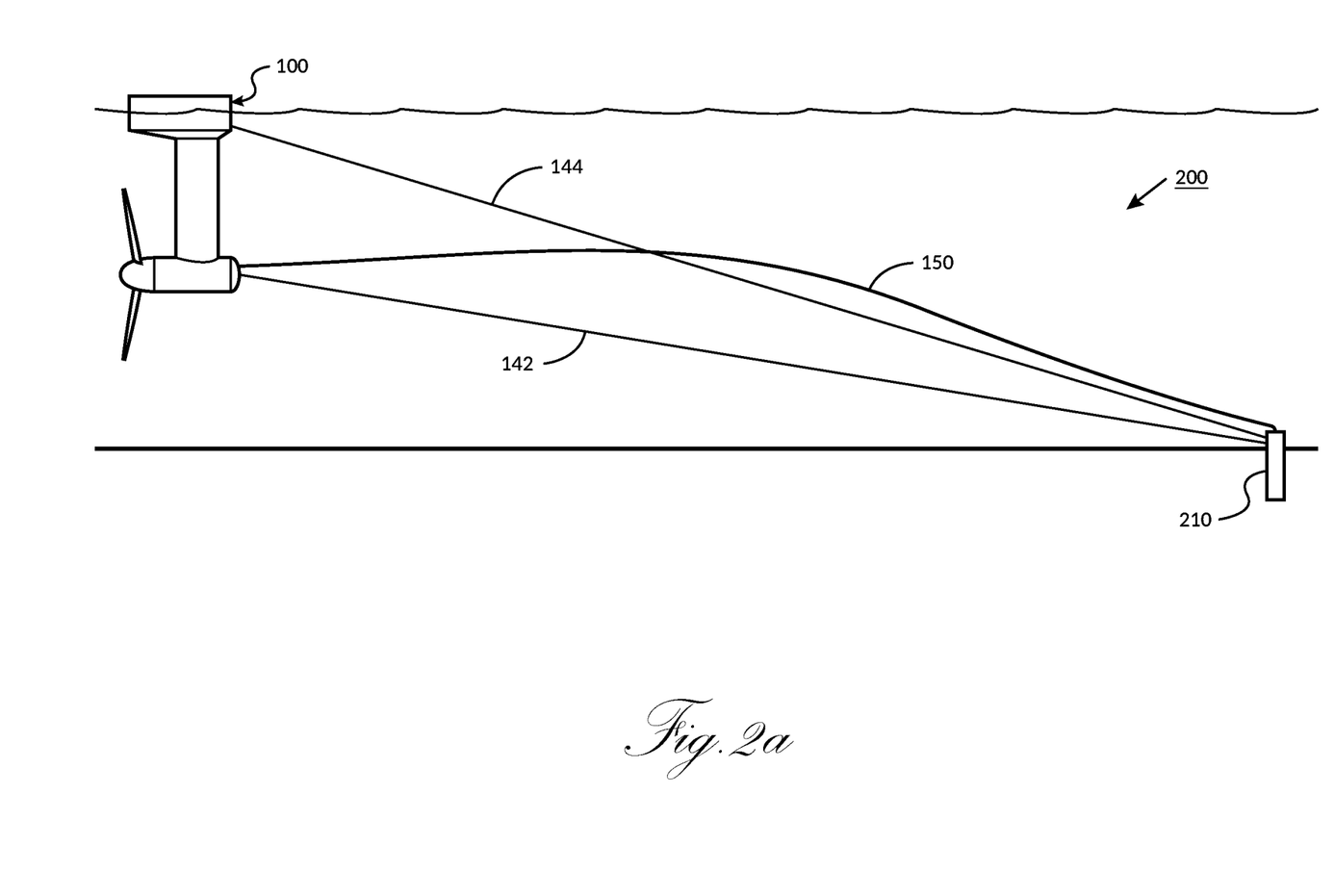
FIG. 2A illustrates the marine current turbine of FIG. 1A with a single-anchor non-bridled mooring arrangement according to an embodiment of the invention.
Figure 2B:
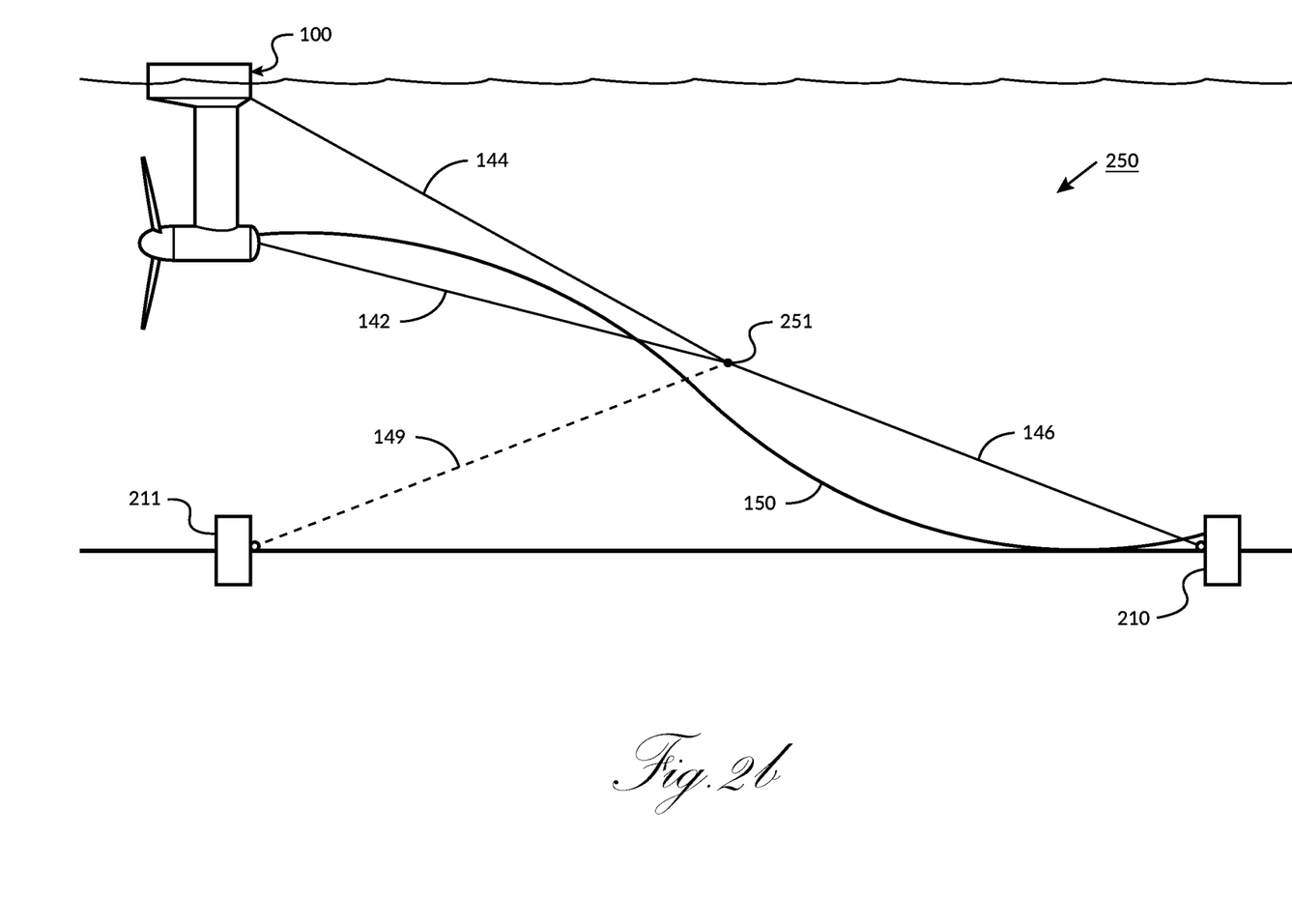
FIG. 2B illustrates the marine current turbine of FIG. 1A with a two-anchor catenary mooring arrangement according to an embodiment of the invention.

FIG. 2A illustrates the marine current turbine 100 with a single-anchor-non-bridled mooring arrangement 200 according to an embodiment of the invention. Here, an anchor 210 is coupled to mooring lines 142 and 144 and the umbilical 150. FIG. 2B illustrates the marine current turbine 100 with a single-anchor-bridled mooring arrangement 250 according to an embodiment of the invention. Here, the anchor 210 is coupled to the umbilical 150 and an intermediate mooring line 146 that connects to mooring lines 142 and 144 at a bridal connection point 251. In another embodiment of the invention, an additional intermediate mooring line 149 connects between the connecting point 251 and a second anchor 211 to provide a two-anchor mooring configuration.

Figure 2C:
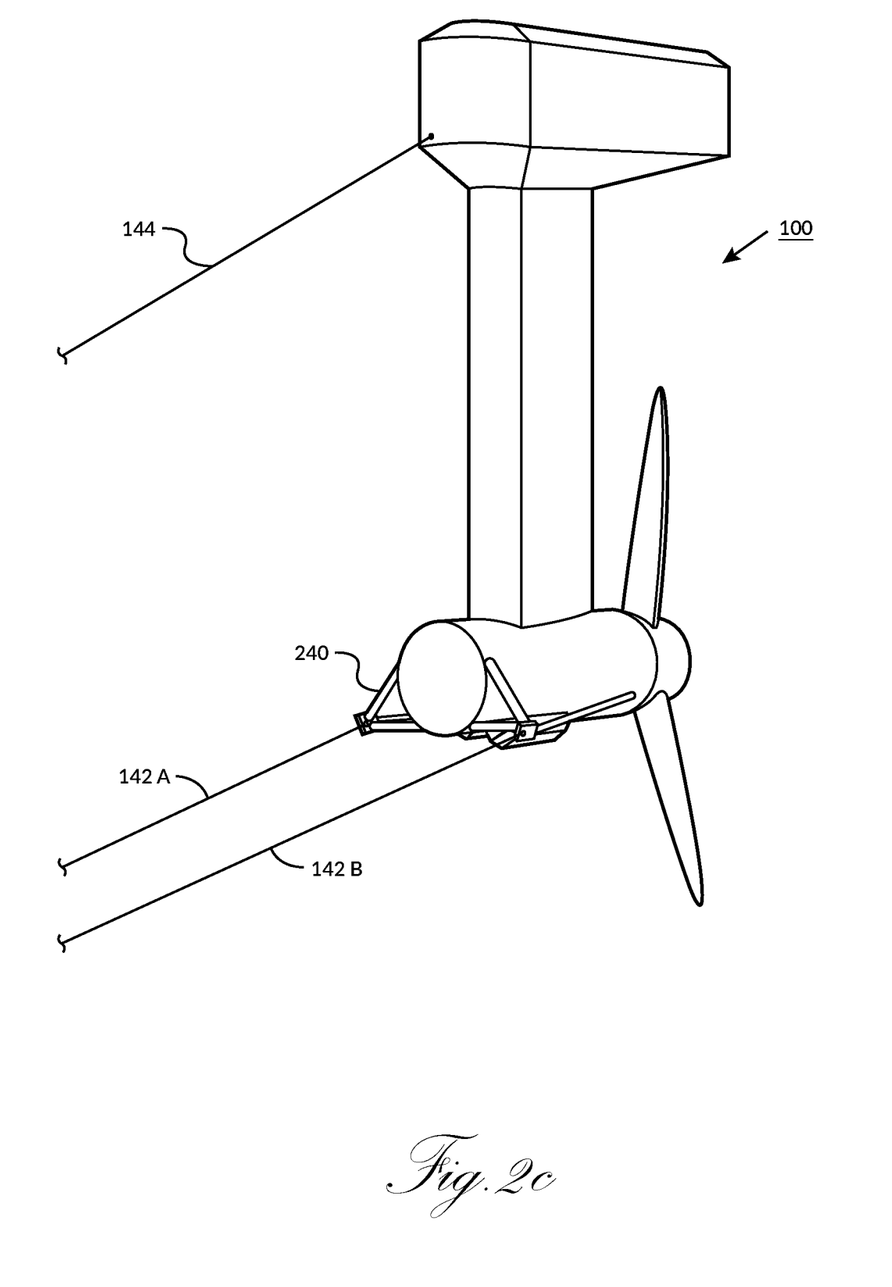
FIG. 2C illustrates the marine current turbine of FIG. 1 with a lower yaw spreader according to an embodiment of the invention.
Figure 2D:
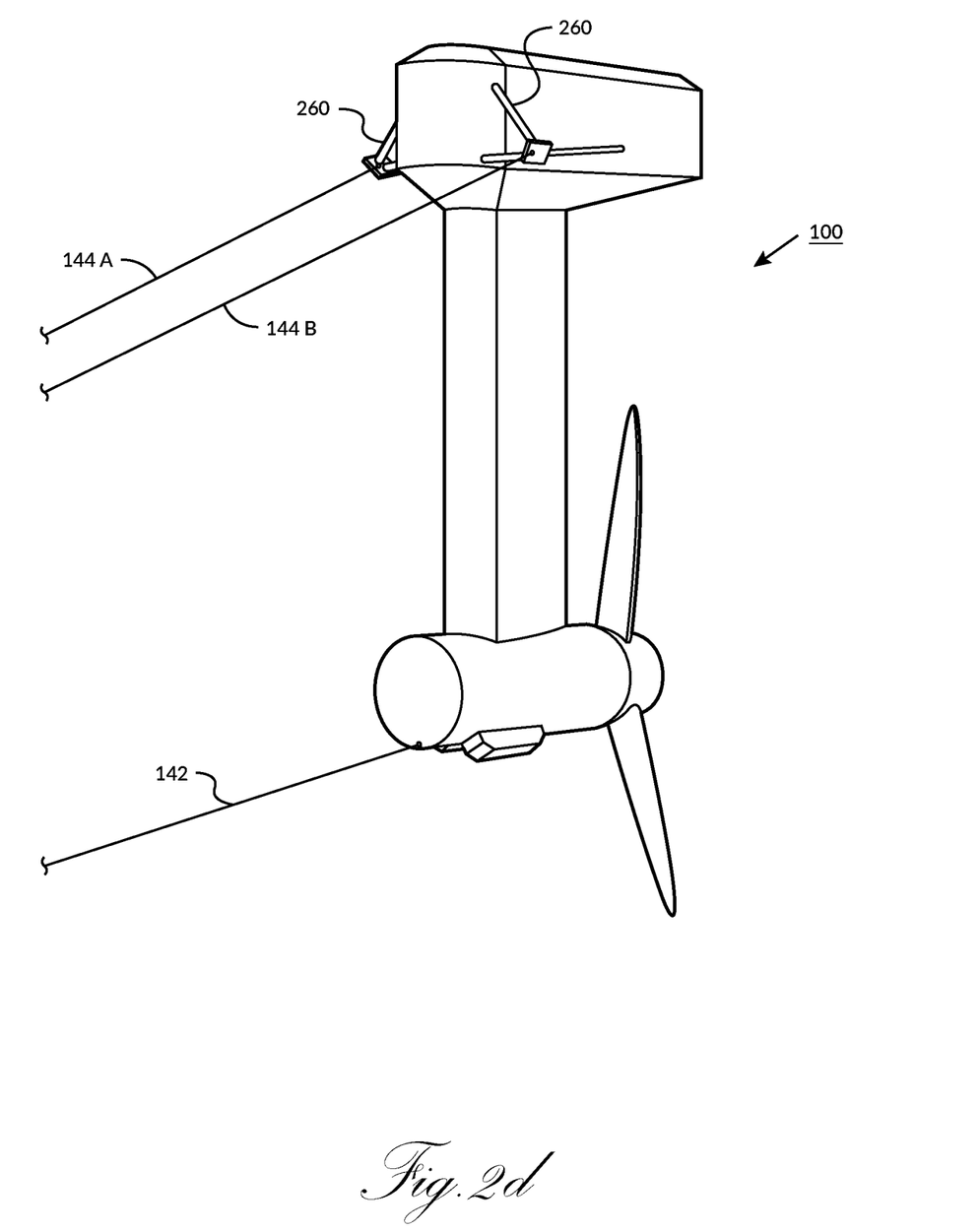
FIG. 2D illustrates the marine current turbine of FIG. 1 with an upper yaw spreader according to an embodiment of the invention.

FIG. 2C illustrates the marine current turbine 100 with a lower yaw spreader 240, providing lateral separation of the lower connection as two points 242A and 242B connecting to two mooring lines 142A and 142B, according to an embodiment of the invention. FIG. 2D illustrates the marine current turbine 100 with an upper yaw spreader 260, providing lateral separation of the upper connection as two points 244A and 244B connecting to two mooring lines 144A and 144B according to an embodiment of the invention.

Figure 3:
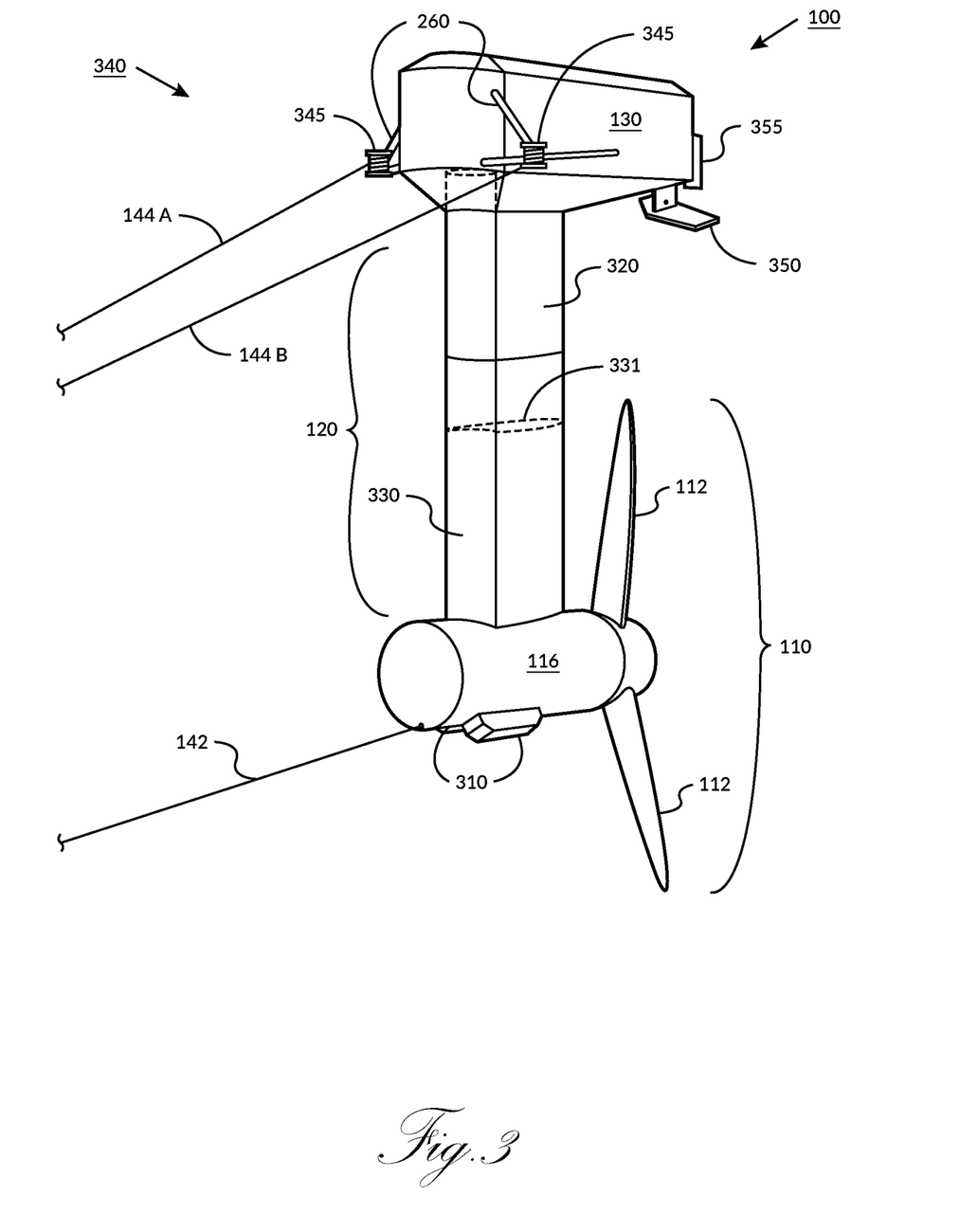
FIG. 3 illustrates a marine current turbine with an active bridle, active ballast, and active control surface arrangements according to embodiments of the invention.

FIG. 3 illustrates a marine current turbine 100 with a bridled, single-anchor mooring arrangement 340 according to an embodiment of the invention. The faired spar 120 comprises a rotatable upper spar fairing 320 to counteract the torque induced in the rotor 110 and a lower portion 330. An optional elevator 350 is added to adjust the pitch of the faired spar 120. In another embodiment, a rudder 355 connecting the elevator 350 to the deckhouse 130 may be actively rotated about its axis to cause a steering force on the rear section of the deckhouse to yaw the turbine 100. In a preferred embodiment of the invention, the mooring arrangement 340 comprises winches 345 on the upper yaw spreader 260 to adjust the tension of the mooring lines 144 at points 244A and 244B.

In another embodiment of the invention, one or more fixed ballast weights 310 are disposed on the nacelle 116 to provide a gravitational counterbalance to buoyancy induced in the faired spar 120 and the deckhouse 130. Variable ballast tanks in the lower portion 330 of the spar fairing 120 provide a means of actively lowering or raising the center of gravity of the turbine 100 by introducing or removing saltwater 331, which also increases or reduces the deckhouse's 130 draft.

A central control system may monitor sensors indicating the turbine's 100 operating conditions and the state of its external environment and make operating decisions to activate control surfaces to cause a response from the turbine 100. Controller programming may prioritize the operational health and safety of personnel onboard the turbine 100, platform 170 stability, power generation capacity, and management of loading conditions that affect the turbine's 100 and mooring system's 340 longevity.

Figure 4A:
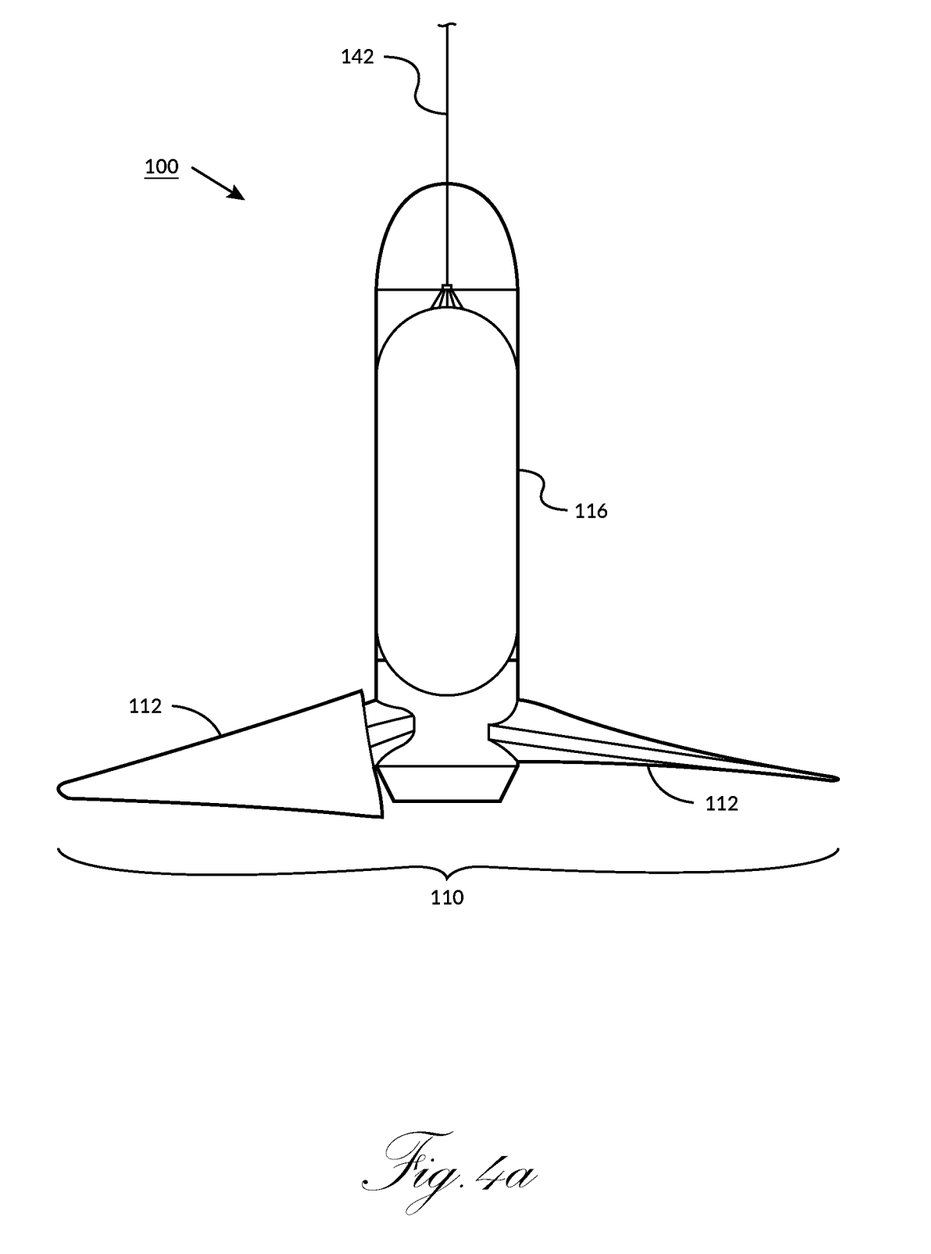
FIGS. 4A-D show embodiments to control the floating spar platform's direction of drift and yaw.
Figure 4B:
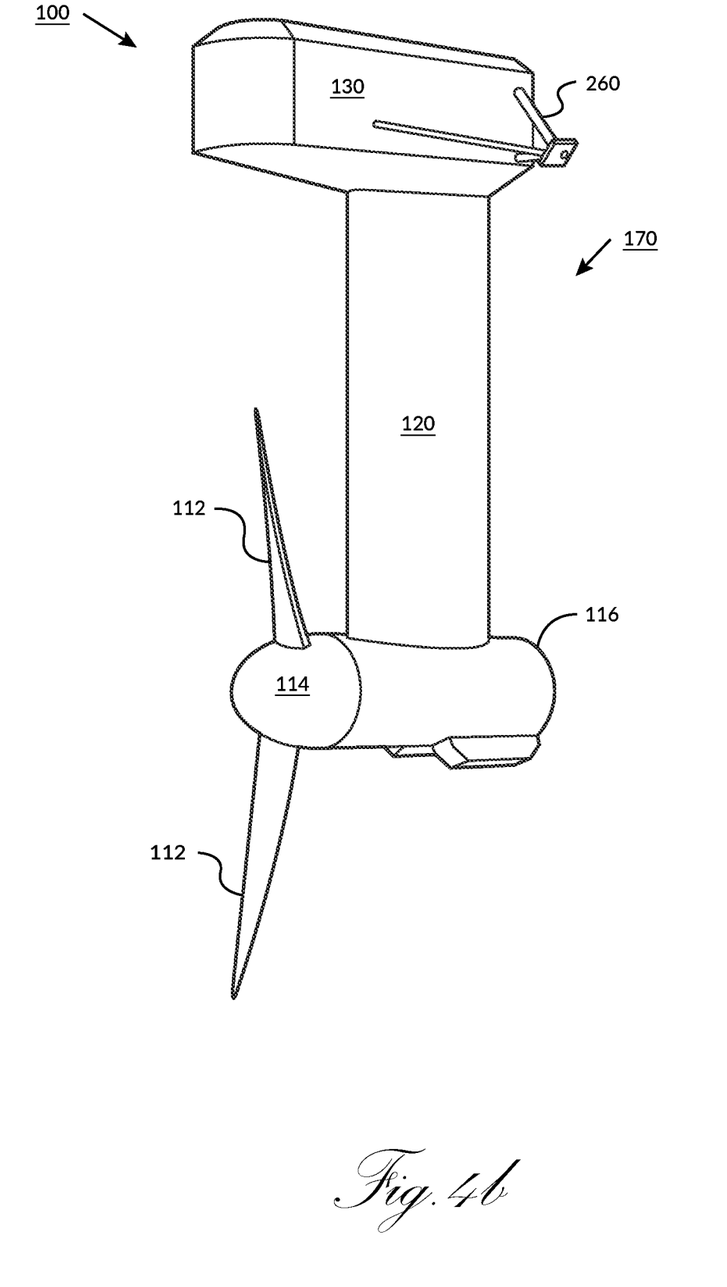
Figure 4C:
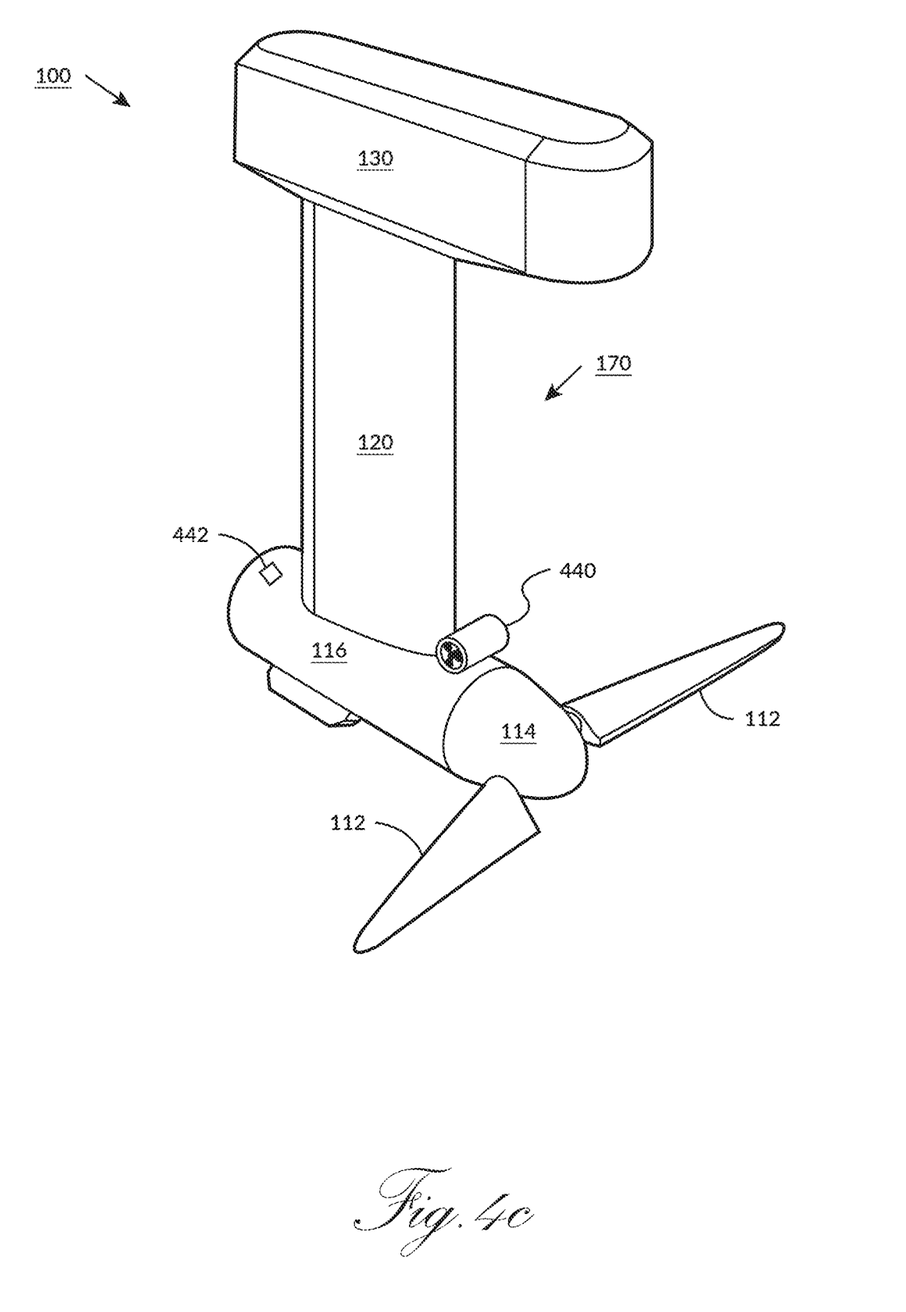
Figure 4D:
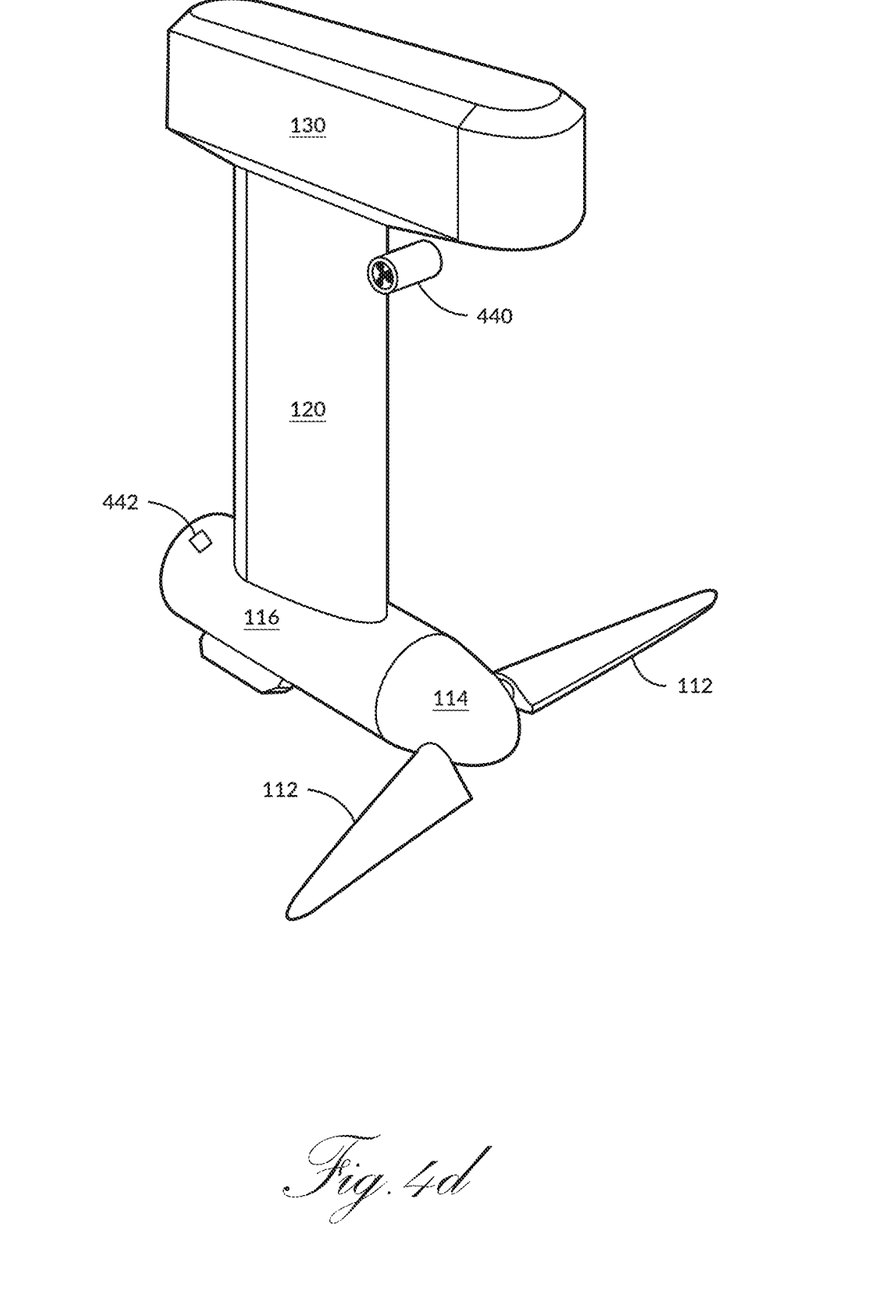

FIGS. 4A-D show embodiments to control the platform's 170 direction of drift and yaw around the anchor point 210, or the bridal connection point 251 in the case of a two-anchor mooring, during tidal current direction changes, to prevent accumulated twisting of the mooring lines 142 and 144 or 146 and the umbilical 150. FIG. 4A shows one embodiment whereby horizontally parked rotor blades 112 are set to differing pitch positions to allow the surrounding current to impose a differential force on the rotor 110 causing the nacelle 116 and platform 170 to yaw in the desired direction. FIG. 4B shows another embodiment whereby the rotor blades 112 are parked vertically and pitched to an angular position causing the nacelle 116 and platform 170 to yaw in the desired direction. FIG. 4C shows another embodiment utilizing a marine thruster 440 positioned laterally on the downstream portion of the nacelle 116 to produce a lateral force on the nacelle 116 causing the nacelle 116 and platform 170 to yaw in the desired direction. FIG. 4D presents a further embodiment whereby the marine thruster 440 is positioned laterally and is submerged on the downstream portion of the deckhouse 130 to produce a lateral force on the deckhouse 130, causing the deckhouse 130 and platform 170 to yaw in the desired direction. The turbine may further comprise a current flow direction sensor 442, wherein the current flow direction sensor 442 activates the thruster 440 in response to sensing a change in current flow direction.

Controlling the direction and arc of the turbine 100 and mooring lines can be commanded by the central controller to prevent mooring entanglement and twist and umbilical electrical cable twist as the turbine 100 is repositioned from one tidal flow direction to the other. One method is to implement a marine thruster 440 positioned in front or behind the platform's hydrodynamic yaw center to actively drive the platform in a direction to avoid random drift that could cause entanglement and cumulative twisting of the platform's electrical cable umbilical 150 and mooring lines 142, 144 and 146. Another method is an asymmetrical pitch of the blades 112 to provide more drag on one side of the platform than the other to achieve a controlled drift direction. A third method utilizes active mooring line tension control using winches 345 on spread mooring lines 144 to augment the rotor or platform hydrodynamic forces to reduce slack in the mooring line and create a controlled drift direction. A fourth method is to implement hydrodynamic control surfaces, such as the rudder 355, to yaw the platform in the tidal flow in a prescribed direction.

Active or passive hydrodynamic control surfaces may be implemented to improve turbine stability and dynamics in yaw, heave, or roll. One control surface is represented by the faired spar 120, which surrounds a tubular spar beam and reduces turbulence and hydrodynamic drag on the platform. Actively rotating the rotatable upper spar 320 causes an asymmetric lift force on one side, perpendicular to the flow, and can counter the torque induced by the rotor 110 and be utilized to prevent lateral roll of the platform 170 not otherwise overcome by buoyancy/ballast forces.

To avoid resonant heave behavior of the spar platform 170 driven by wave conditions, the variable ballast tanks may be used to tune the natural frequency of the spar by pumping ballast water 331 in or out of the variable ballast tanks in response to the average sea state. Adding ballast water 331 to the variable ballast tanks improves roll stability by lowering the center of gravity and causing the platform's first-order natural frequency to shift to a lower frequency. Conversely, pumping ballast water 331 out of the variable ballast tanks will increase the natural frequency. Avoiding alignment of wave frequency and the platform's natural frequency will reduce the heave excitation of the turbine 100.

Platform 170 may be assembled from the principal components described: deckhouse 130, spar 120, and nacelle 116. Bolted joints may be provided between these components or elsewhere to enable the turbine to be broken down into smaller parts for shipping, or the platform 170 may be joined by welding or other means of fastening, the identification and implementation of which are apparent to one of ordinary skill in the art.

The turbine 100 may be towed to or from the site in a vertical orientation using a tow bridle attached to the primary mooring points 143, 145 with blades feathered.

The invention has been described herein using specific embodiments for illustration only. However, it will be readily apparent to one of ordinary skill in the art that the invention's principles can be embodied in other ways. Therefore, the invention should not be regarded as limited in scope to the specific embodiments disclosed herein; it should be fully commensurate in scope with the following claims.

We claim:

1. A marine current turbine system for converting current flow into electricity comprising:
    a floating spar platform comprising a nacelle at a bottom end, a faired spar at a midsection, and a deckhouse at a top end, wherein the faired spar comprises a teardrop body and a V-shaped tail;
    means for mooring the floating spar platform to a bottom of a marine environment comprising a first mooring line coupled to the nacelle and a second mooring line coupled to the deckhouse, wherein the first mooring line and the second mooring line are disposed within a vertical plane; and
    a rotor disposed at a downstream end of the nacelle, wherein the deckhouse is configured to provide buoyancy and is at least partially submerged during operation of the rotor to convert current flow into electricity.

2. The marine current turbine system of claim 1, wherein the faired spar comprises a rotatable fairing.

3. The marine current turbine system of claim 1 further comprising a thruster configured to translate and yaw the turbine.

4. The marine current turbine system of claim 1, wherein the faired spar includes a ballast tank.

5. The marine current turbine system of claim 4, wherein flooding or evacuating the ballast tank, causes the turbine's natural frequency to vary.

6. The marine current turbine system of claim 4, wherein vertical motion of the deckhouse subjected to wave conditions is modified by flooding or evacuating the ballast tank.

7. The marine current turbine system of claim 1, wherein the deckhouse comprises a rudder and an elevator.

8. The marine current turbine system of claim 1, wherein the deckhouse comprises a greater waterplane area and buoyancy volume relative to the faired spar.

9. A marine current turbine system for converting current flow into electricity comprising:
    a floating spar platform comprising a nacelle at a bottom end, a faired spar at a midsection, and a deckhouse at a top end;
    means for mooring the floating spar platform to a bottom of a marine environment comprising a nacelle attachment point and a spreader disposed on the deckhouse, wherein the nacelle attachment point and the spreader comprise outer end connection points for attaching one or more mooring lines; and
    a rotor comprising a plurality of blades operating within a rotor plane, wherein the nacelle attachment point and a horizontal center of the spreader are disposed within a vertical plane defined by a vertical axis of the floating spar platform and a rotation axis of the rotor, the deckhouse is configured to provide buoyancy and is at least partially submerged during operation of the rotor to convert current flow into electricity, and the faired spar and the deckhouse provide maintenance access to the rotor.

10. The marine current turbine system of claim 9 further comprising a thruster configured to drive the rotor in an intended direction between current flow changes and a current flow direction sensor, wherein the current flow direction sensor activates the thruster in response to sensing a change in current flow direction.

11. The marine current turbine system of claim 9, wherein the rotor is configured to park in a horizontal position to allow maximum bottom clearance during shallow tide or extreme wave conditions.

12. The marine current turbine system of claim 9, wherein the faired spar comprises a rotatable fairing.

13. The marine current turbine system of claim 9, wherein the deckhouse comprises a rudder and an elevator.

14. A marine current turbine system comprising:
   a floating spar platform including a deckhouse, a faired spar, and a nacelle,
   a turbine located at the nacelle of the floating spar platform, the turbine comprising a rotor, wherein the deckhouse is configured to provide buoyancy and is at least partially submerged during operation of the rotor to convert current flow into electricity, and
   means for mooring the floating spar platform to a bottom of a marine environment comprising a deckhouse attachment point and a spreader disposed on the nacelle, wherein the deckhouse attachment point and a horizontal center of the spreader are disposed within a vertical plane defined by a vertical axis of the floating spar platform and a rotation axis of the rotor.

15. The marine current turbine system of claim 14, wherein in operation of the turbine, the floating spar platform floats vertically with the marine current turbine system's center of gravity located below marine current turbine system's center of buoyancy.

16. The marine current turbine system of claim 14, wherein the rotor comprises variable pitch blades.

17. The marine current turbine system of claim 14, wherein the deckhouse is configured to provide access the turbine, provide buoyancy, and is at least partially submerged during operation of the rotor to convert current flow into electricity.

18. The marine current turbine system of claim 14, wherein the floating spar platform comprises the faired spar with a teardrop body and a V-shaped tail.

19. The marine current turbine system of claim 14 further comprising a thruster configured to drive the rotor in an intended direction between current flow changes and a current flow direction sensor, wherein the current flow direction sensor activates the thruster in response to sensing a change in current flow direction.

\* \* \* \* \*